US005558893A

United States Patent [19]

Muraldihara

[11] Patent Number: 5,558,893

[45] Date of Patent: Sep. 24, 1996

[54] REMOVAL OF PESTICIDES FROM CITRUS PEEL OIL

[75] Inventor: Harapanahalli S. Muraldihara, Plymouth, Minn.

[73] Assignee: Cargill, Incorporated, Minneapolis, Minn.

[21] Appl. No.: 411,345

[22] Filed: Mar. 27, 1995

[51] Int. Cl.[6] .................... A23L 1/015

[52] U.S. Cl. .................... 426/492; 426/286; 426/616

[58] Field of Search .................... 426/492, 286, 426/312, 599, 616, 431, 487, 488

[56] References Cited

U.S. PATENT DOCUMENTS

| | | | |
|---|---|---|---|
| 1,885,100 | 10/1932 | Robinson | 426/286 |
| 1,975,361 | 10/1934 | Henry | 426/286 |
| 1,983,478 | 12/1934 | Moe | 426/286 |
| 2,573,699 | 11/1951 | Eskew et al. . | |
| 2,641,550 | 6/1953 | Dykstra . | |
| 3,248,233 | 4/1966 | Brent et al. . | |
| 3,619,201 | 11/1971 | Archer et al. | 426/286 |
| 3,867,262 | 2/1975 | Rockland et al. . | |
| 4,126,709 | 11/1978 | Johnson et al. . | |
| 4,818,555 | 4/1989 | Piotrowski et al. . | |
| 4,871,569 | 10/1989 | Anderson et al. . | |
| 4,973,485 | 11/1990 | Rich . | |
| 5,310,567 | 5/1994 | Nakaji et al. | 426/250 |

FOREIGN PATENT DOCUMENTS

| | | | |
|---|---|---|---|
| 2409348 | 9/1974 | Germany | 426/286 |

OTHER PUBLICATIONS

Hartman et al. "Tests Show How To Remove Spray Residue" Better Fruit. Jan. 1927, #7 pp. 5, 6, and 16.

Bills et al., "Removal of Chlorinated Insecticide Residues from Milk Fat", *J. Agr. Food Chem.*, 15(4), 676–8 (1967).

Vioque et al., "Residuos de pesticidas en grasas comestibles. II. Eliminacion de insecticidas clorados durante la refinacion" *Grasas y Aceites,* (Seville), 24(1), 20–6 (1973) —relates to removal of pesticides from edible fats (olive oil) using steam distillation (vacuum) [Article in Spanish].

*Primary Examiner*—Anthony J. Weier

*Attorney, Agent, or Firm*—Fitch, Even, Tabin & Flannery

[57] ABSTRACT

A process is disclosed for the preparation of citrus oils which are essentially pesticide free. The essentially pesticide-free citrus oil is prepared by gently distilling raw citrus oil in a short-path distillation column whereby the essentially pesticide-free citrus peel oil is collected as the distillant. Suitable citrus oils include citrus peel oils and citrus stripper oils with citrus peel oils being preferred. The essentially pesticide-free citrus peel oil generally contains less than about 1.6 ppm total pesticides, preferably less than about 0.5 ppm total pesticides, more preferably less than 0.1 ppm total pesticides, and most preferably less than 0.05 ppm total pesticides. The distillation residue contains essentially all the pesticides contained in the raw citrus peel oil. The essentially pesticide-free citrus oil, especially the essentially pesticide-free orange peel oil, can be used as a food additive (especially as an additive in orange juice) to enhance aroma and flavor characteristics and as a non-food additive in perfumes, soaps, cosmetics, lotions, and the like.

22 Claims, 2 Drawing Sheets

REMOVAL OF PESTICIDES FROM CITRUS PEEL OIL

FIELD OF THE INVENTION

This invention generally relates to processing citrus fruits, especially oranges, to provide citrus peel oils, citrus stripper oils, and fruit juices which are essentially free of residual pesticides. More specifically, this invention relates to a method of removing pesticides from citrus peel oils and citrus stripper oils. The essentially pesticide-free citrus peel oils or citrus stripper oils, which are rich in aroma and flavor components, can be added to the juice or juice concentrate obtained from the citrus fruit (pulp and juice) to provide an essentially pesticide-free citrus fruit juice.

BACKGROUND OF THE INVENTION

Citrus peel oils are generally prepared by expression of the essential oils from the peel of citrus fruits, such as grapefruit, oranges, and the like. The essential oils are generally contained in numerous oval sacs which are irregularly distributed in the outer colored portion or "flavedo" portion of peel. During expression, the sacs are mechanically ruptured (e.g., by crushing the peel) and the oils contained in the sacs are liberated and collected as an aqueous slurry along with cell water and cell debris. The citrus peel oil is separated and clarified by decantation, centrifugation, filtration, or similar process. Especially with oranges, the citrus peel oil can also be prepared by a so-called de-oiling process whereby the entire outer peel portion of the whole fruit is lightly cut or pricked by a scarifier device. The cuts or pricks allows the peel oil to exude from the sacs and out of the peel. The exuded peel oil is then washed off the fruit, collected, and then separated and clarified in the same or similar manner as for expressed peel oil. The de-oiling process is often used to limit the amount of citrus peel oil in the extracted juice.

Citrus peel oils are usually high in aroma and flavor components derived from and associated with the particular fruit. Such citrus peel oils, which generally contain up to about 90 weight percent d-limonene, are used as flavoring additives in bakery goods, soft drinks, citrus juices, and the like. Such citrus peel oils may also be used as additives in non-food products such as perfumes, soaps, cosmetics, lotions, and the like. Orange peel oil is often used as an additive for orange juice concentrate and orange juice to enhance the aroma and flavor.

Unfortunately, low but significant levels of pesticides can often be found in citrus peel oil. It appears that at least some pesticides are absorbed from the soil by the tree roots and then concentrated in the fruit peel. Pesticides, if applied during the fruit formation period, may also be directly absorbed into the peel. During expression or de-oiling processes, the pesticides may be released along with, and thus contained in, the resulting citrus peel oil. Depending on the specific levels of pesticides present, the value and usefulness of the citrus peel oil can be significantly reduced.

Pesticides are generally not found to a significant extent in the non-peel portion of citrus fruits. Thus, unless a significant amount of the peel oil is released during juice extraction or is added back to the juice product at a later time, pesticide contamination of the citrus juice produced is generally at a relatively low level.

Nonetheless, on occasion higher than desirable levels of pesticides may be found in the juice product or the stripper oil derived from such juice. Stripper oil (sometimes also referred to as oil phase essence) is the volatile material removed from the raw juice prior to preparing the orange juice concentrate by evaporative concentration. The stripper oils, which contain aroma and flavor volatiles, are generally added back to the concentrated orange juice to enhance the aroma and flavor characteristics. U.S. Pat. Nos. 4,973,485, 3,248,233, 2,641,550, and 2,573,699 (all of which are incorporated by reference) describe illustrative processes for preparing concentrated orange juice where the volatiles (i.e., stripper oil) are first removed and then added back to the concentrated juice.

Attempts to reduce the amount of pesticides in citrus peel oil and the like have essentially been limited to efforts to reduce the level of pesticide use and/or provide biodegradable pesticides. To this end, some pesticides have been totally banned for use on citrus trees in the United States. The use of other pesticides has been limited in regard to the amount which can be applied and/or the time in the growing cycle in which the pesticides can be applied. Although banning or use restrictions for certain pesticides can reduce the levels of pesticides in the peel, and ultimately in the citrus peel oil, it may (and likely will) also reduce the overall fruit and juice yields as well as the quality of the fruit and resulting juice due to insect and other crop damage. Although the development of biodegradable pesticides appears promising, such pesticides are unlikely to completely eliminate the need for the non-biodegradable pesticides currently in use. Thus, the use of pesticides in the citrus industry—even if significantly restricted and regulated—is expected to continue for the foreseeable future.

Since it is not possible in the foreseeable future to completely eliminate the use of pesticides in the citrus industry, other approaches are needed to remove pesticides from such citrus oils (especially from citrus peel oils). It would be desirable, therefore, to provide a method by which the levels of pesticides present in raw citrus peel oils and/or raw stripper oils could be significantly reduced. It would also be desirable to provide an essentially pesticide-free citrus peel oil, especially an essentially pesticide-free orange peel oil. It would also be desirable to provide an essentially pesticide-free citrus peel oil with improved aroma and flavor characteristics. The present invention provides such processes and citrus oils.

SUMMARY OF THE INVENTION

Figure 1:
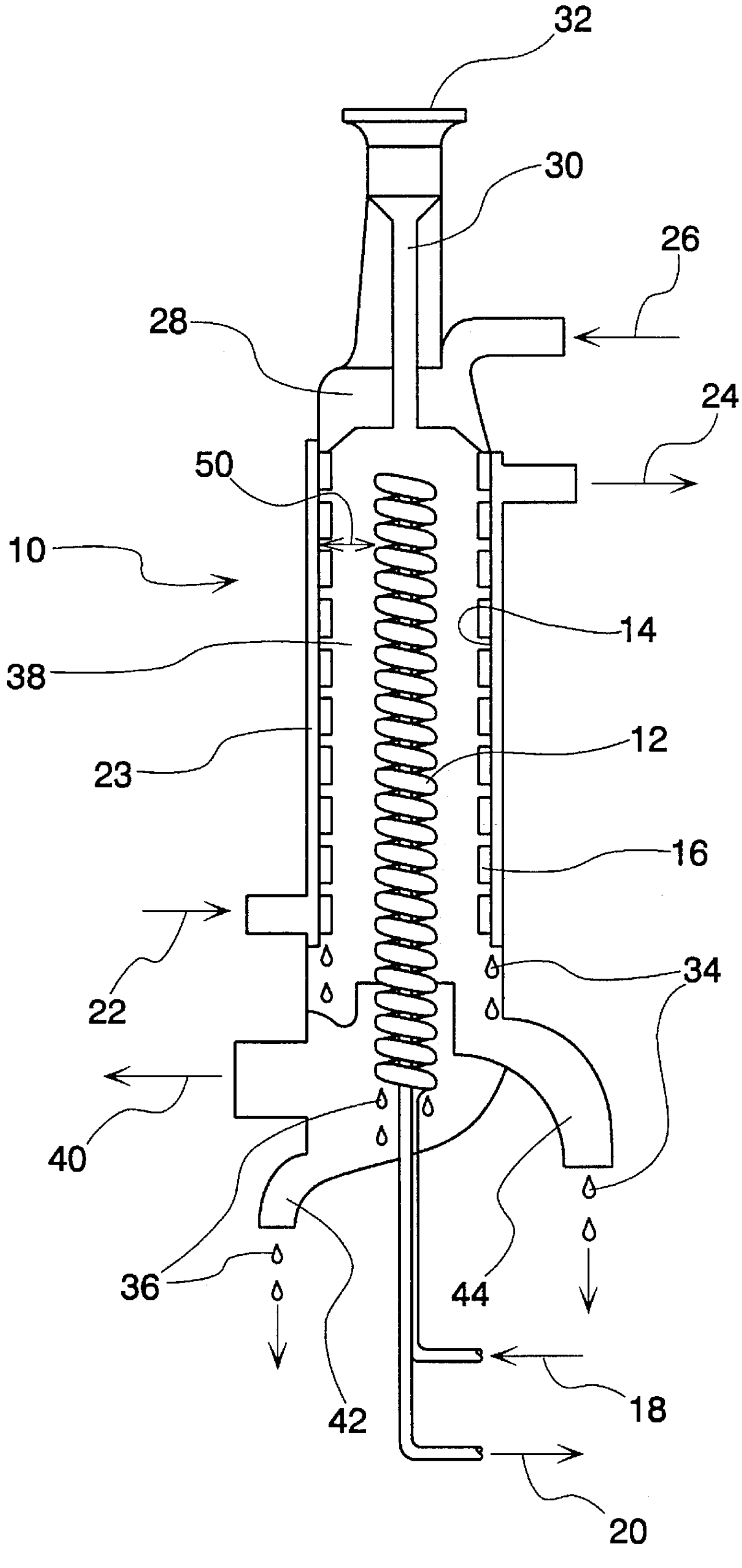
FIG. 1 is a cross-sectional view of a short-path distillation column for use in the present invention.

This invention relates to the preparation of citrus peel oils and citrus stripper oils which are essentially pesticide free. This invention also relates to the preparation of fruit juices employing the essentially pesticide-free citrus peel oils and stripper oils of this invention. The use of the essentially pesticide-free citrus peel oils and stripper oils of the present invention allows more complete use of the citrus fruit, including the aroma and flavor components found in citrus peel oil and stripper oil, while still providing a juice product that is essentially pesticide free.

The present invention can be used to prepare essentially pesticide-free citrus peel oils from citrus fruits, including oranges, grapefruits, lemons, limes, and the like. The present invention can also be used to prepare essentially pesticide-free stripper oils from citrus fruits, including oranges, grape fruits, lemons, limes and the like. Oranges are the most preferred citrus fruits for use in the present invention.

The essentially pesticide-free citrus oil of this invention is prepared by gently distilling raw citrus oil in one or more short-path distillation columns whereby the essentially pesticide-free citrus oil is collected as the distillant. The distillation residue contains essentially all the pesticides contained in the raw citrus oil. The citrus oils suitable for use in the present invention include citrus peel oils and citrus stripper oils. The preferred citrus oil is citrus peel oil. The short-path distillation columns used in this invention are often termed or referred to as "molecular stills" or "molecular distillation columns."

Preferably, the essentially pesticide-free citrus peel oils of this invention are prepared by gently distilling the raw citrus oil in a distillation system containing a single short-path distillation column. A distillation system containing two or more short-path distillation columns, if desired, can also be used. In such a multiple column system, the unevaporated material or residue from each column is used as the feed material for the next column in the series (except that the raw citrus oil is used as the feed material for the first column). The residue becomes increasingly concentrated in pesticide components as it passes through the series of distillation columns. The distillant from each of the columns is collected for use as an essentially pesticide-free oil. The individual distillant fractions from each column may be used separately or various fractions or all the fractions may be combined. The residue from the last column in the series contains essentially all of the pesticides from the raw citrus oil and can be disposed of in an environmentally acceptable manner.

One object of the present invention is to provide a method for producing an essentially pesticide-free citrus oil, said process comprising (1) gently distilling citrus oil feed material in a short-path distillation column at a temperature of about 80° to 135° C. and a pressure of about 2 to 80 mm Hg to form about 80 to 97 weight percent distillant and about 3 to 20 weight percent residue, wherein the distillant is essentially pesticide free and the residue contains essentially all the pesticides from the citrus oil feed material and (2) collecting the distillant as the essentially pesticide-free citrus oil.

Another object of the present invention is to provide a method for producing an essentially pesticide-free citrus oil, said process comprising (1) gently distilling citrus oil feed material in a first short-path distillation column at a temperature of about 80° to 115° C. and a pressure of about 5 to 80 mm Hg to form about 60 to 97 weight percent of a first distillant and about 3 to 40 weight percent of a first residue based on the weight of the feed material, (2) collecting the first distillant, (3) gently distilling the first residue in a second short-path distillation column at a temperature of about 115° to 135° C. and a pressure of about 2 to 20 mm Hg to form about 20 to 40 weight percent of a second distillant and about 60 to 80 weight percent of a second residue based on the weight of the first residue, and (4) collecting the second distillant, wherein the first and second distillants are essentially pesticide-free oils and the second residue contains essentially all the pesticides from the feed material.

Another object of the present invention is to provide a method for producing an essentially pesticide-free citrus oil in a distillation system containing at least three short-path distillation columns arranged in series, said method comprising (1) feeding and gently distilling citrus oil feed material in the first column in series at a temperature of about 80° to 115° C. and a pressure of about 5 to 80 mm Hg to form a distillant stream and a residue stream; (2) collecting the distillant stream from the first column; (3) feeding the residue stream from the preceding column into the next column in series and gently distilling the residue stream at a temperature of about 115° to 135° C. and a pressure of about 2 to 20 mm Hg to form a new distillant stream and a new residue stream associated with this column; (4) collecting the distillate stream from step (3); (5) repeating steps (3) and (4) for each additional column in series through the last column wherein the residue stream from the preceding column is the feed material for the next column and the distillate stream from each column is collected; and (6) combining the distillate streams from the columns to form the essentially pesticide-free citrus oil; wherein the residue stream from the last column in series contains essentially all the pesticides from the feed material.

Still another object of the present invention is to provide an essentially pesticide-free citrus peel oil comprising the oil extract derived from citrus fruit peels contaminated with relatively high levels of pesticides wherein the pesticides have been removed such that the essentially pesticide-free citrus peel oil contains less than about 1.6 ppm total pesticides. Preferably the essentially pesticide-free citrus peel oil contains less than about 0.5 ppm total pesticides, more preferably less than 0.1 ppm total pesticides, and most preferably less than 0.05 ppm total pesticides.

Still another object of this invention is to provide an essentially pesticide-free citrus juice comprising (1) citrus juice concentrate, (2) water, and (3) about 0.005 to 0.05 volume percent essentially pesticide-free citrus peel oil; wherein the essentially pesticide-free citrus peel oil is an oil extract derived from citrus fruit peels contaminated with relatively high levels of pesticides wherein the pesticides have been removed such that the essentially pesticide-free citrus peel oil contains less than about 1.6 ppm total pesticides.

These and other objects and advantages of the present invention will become apparent through the following description of the preferred embodiments of the invention and the detailed description of the drawings.

DESCRIPTION OF THE PREFERRED EMBODIMENTS

The present invention relates to a method for the production of essentially pesticide-free citrus oils and to the essentially pesticide-free citrus oils obtained therefrom. Suitable citrus oils include citrus peel oils and citrus stripper oils. Generally citrus peel oils are preferred in the practice of this invention. The essentially pesticide-free citrus oils, especially the essentially pesticide-free orange oils, are high in aroma and flavor components. Removal of pesticides and like residues allows for incorporation of higher levels of the citrus oil in juice products. Removal of the pesticide and like residues under the conditions of this invention also results in a more favorable and acceptable juice or food additive. For example, the essentially pesticide-free citrus oil, especially oil derived from oranges, of this invention can be used to advantage to prepare an essentially pesticide-free citrus juice comprising (1) citrus juice concentrate, (2) water, and (3) about 0.005 to 0.05 volume percent essentially pesticide-free citrus oil. Preferably, the essentially pesticide-free orange juice of this invention will contain about 0.01 to 0.035 volume percent essentially pesticide-free citrus oil. The essentially pesticide-free citrus oils of this invention can also be used to advantage in non-food products and applications, especially for those products designed to be applied to the skin.

The present invention can be used to prepare essentially pesticide-free citrus oils from citrus fruits, including oranges, grapefruits, lemons, limes, and the like. Oranges are the most preferred citrus fruits for use in the present invention. Although other varieties of oranges can be used, the Valencia varieties, Pera varieties, and Natal varieties are generally preferred. Especially preferred are Valencia varieties including Florida Valencia, California Valencia, and Brazilian Valencia.

The essentially pesticide-free citrus oils of this invention are prepared by gently distilling the raw oil in a short-path distillation column whereby an essentially pesticide-free citrus oil is collected as the distillant and the pesticide residues are concentrated in the distillation residue (i.e., the distillation "bottoms"). For purposes of this invention, "gently distilling" means distilling under temperature and pressure conditions whereby the decomposition of the citrus oil is not significant. Generally, gently distilling involves temperatures less than about 135° C. and pressure below about 80 mm Hg, and preferably below about 60 mm Hg. The distillation residue, which contains essentially all the pesticides from the raw oil, can be disposed of in any environmentally acceptable manner. The process of this invention can be operated in batch, semi-batch, and continuous modes. Generally, a continuous process will be preferred.

The present invention uses a so-called short-path distillation column or evaporator to effectively eliminate or remove the pesticides from citrus oils. Such short-path distillation columns are often referred to as "molecular stills." For a traditional molecular still, the distance between the evaporation surface and the condensation surface is less than the mean free path of the molecules at the operating pressure. In a molecular still, the mean free path is often on the order of only a few centimeters. In order to achieve acceptable production or distillation rates, however, the distance between the evaporation surface and the condensation surface is increased somewhat above the mean free path distance. For short-path distillation columns suitable for this invention, the evaporation surface and the condensation surface are maintained in close proximity. For purposes of this invention, "close proximity" means a distance less than about 50 cm and preferably between about 5 to 50 cm. In spite of the increased separation between the evaporator and condenser, however, such short-path distillation columns or evaporators operate, in many respects, in a manner similar to traditional molecular stills.

Suitable distillation columns for use in this invention include falling-film short-path distillation columns, centrifugal short-path distillation columns, wiped-film short-path distillation columns, and the like. FIG. 1 generally illustrates a preferred short-path distillation column or evaporator 10 for use in this invention. Short-path distillation columns similar to the one illustrated in FIG. 1 are available from UIC Inc. of Joliet, Ill. Of course, other short-path distillation columns or evaporators can also be used.

The present invention will now be explained by reference to FIGS. 1 and 2 and using, for illustrative purposes, citrus peel oil as the citrus oil. Other citrus oils, including stripper oils, can be used and treated in like fashion.

As shown in FIG. 1, the short-path distillation column 10 has a vertical evaporator surface 14 located in close proximity to an internal condenser 12. Raw citrus peel oil 26 is fed onto the top of the evaporator surface 14 through reservoir 28. It is generally preferred that raw citrus peel oil 26 is degassed, using conventional techniques, prior to being fed onto evaporator surface 14. The raw citrus peel oil 26 flows down the evaporator surface 14 while the roller-wipers 16 distribute the citrus peel oil over the evaporator surface 14 in the form of a thin film. A drive motor or other rotational device (not shown) is attached to the top of the evaporator 10 at flange 32 to rotate shaft 30 and the roller-wipers 16. The simultaneous effect of gravity and the roller-wipers 16 allows for the formation of a moving, uniform, thin film of the citrus peel oil over the entire evaporator surface 16. This essentially constant movement (in both vertical and horizontal directions) of the thin film minimizes the formation of hot spots. Heat is applied to the thin film on evaporator surface 16 by circulating a heat transfer fluid through heat exchange jacket 23; the heat transfer fluid enters via inlet 22 and is removed at outlet 24. The heat transfer fluid can be any suitable heat transfer fluid, including, for example, water, pressurized water, steam, ethylene glycol, oil, and the like.

Space 38 between the evaporator surface 14 and the internal condenser 12 is evacuated via vacuum port 40. The combination of heat and vacuum allows the relatively volatile components from the raw citrus peel oil to escape from the thin film, travel across space 38, and condense on internal condenser 12. The evaporator surface 14 and the internal condenser 12 are within close proximity (i.e., the distance 50 is generally only somewhat larger that the mean free distance of the distillant molecules at the operating pressure of the column). The internal condenser 12 is chilled by passing a cooling fluid, preferably water at or below room temperature, through the condenser 12 via inlet 18 and outlet 20. If desired, cooling fluids (e.g., methanol) which allow for temperatures lower than 0° C. can be used. The internal condenser 12 should be maintained at a temperature where volatile materials in the citrus peel oil will condense but not solidify on the condenser surface. Generally the internal condenser 12 is maintained at a temperature of about 0° to 40° C. and preferably at a temperature of about 20° to 30° C. Distillant 36 will flow down and drip off the bottom of condenser 12 where it is collected at distillant outlet 42. Distillant 36 is essentially pesticide-free citrus peel oil which is rich in aroma and flavor components.

As the raw citrus peel oil travels down the evaporator surface 14 it becomes pesticide rich (i.e., the relative concentration of pesticides increases). The pesticide-rich residue 34 dripping off the bottom of the evaporator surface 14 is collected at residue outlet 44. The residue collected at outlet 44 can be fed into another short-path distillation column (see FIG. 2) or can be disposed of in an environmentally acceptable manner (e.g., incineration or disposal in specially designated landfills meeting relevant environmental standards).

Using a distillation system containing only one short-path distillation column (as shown in FIG. 1), the distillant fraction generally consists of about 80 to 97 weight percent and preferably about 90 to 97 weight percent of the raw citrus peel oil. Using a distillation system containing two or more short-path distillation columns (as illustrated in FIG. 2), the distillant fraction from the first column generally consists of about 60 to 97 weight percent and preferably about 90 to 95 weight percent of the raw citrus peel oil and the distillant fraction from the second column generally consists of about 20 to 40 weight percent and preferably about 30 to 40 weight percent of the feed material residue) from the previous column. The essentially pesticide-free citrus peel oil (i.e., distillant 36 in FIG. 1) is generally ready for use. It can, however, be further purified using conventional, preferably low temperature, purification procedures if desired. Or if the pesticide levels remain too high or if ultra-low pesticide levels are required, the distillant could be used as the feed material for a second pass through an additional short-path distillation column; such a process could be repeated as often as desired.

The essentially pesticide-free citrus peel oil of this invention can preferably be prepared in a short-path distillation column, such as illustrated in FIG. 1, by gently distilling the raw citrus peel oil at a temperature of about 80° to 135° C. and a pressure of about 2 to 80 mm Hg. More preferably, the short-path distillation column is operated at a temperature of about 85° to 115° C. and a pressure of about 5 to 25 mm Hg. Generally the residence time of the feed material through the distillation column is on the order of about 1 to 5 minutes. The relatively low temperatures, short residence time, and the general absence of hot spots on the evaporator surface significantly reduce the likelihood of thermal decomposition processes occurring in the distillation column. Thus the desired aroma and flavor components in citrus peel oil are likely to remain unchanged in the essentially pesticide-free citrus peel oil of this invention.

Generally a distillation system using a single short-path distillation column is preferred. In some instances, however, the use of two or more short-path distillation columns arranged in series may be preferred. The use of multiple short-path distillation columns in series is illustrated in FIG. 2. Each of columns 100 and 200 in FIG. 2 are short-path distillation columns which are shown in schematic form only; they may be the same or similar type as the column shown in FIG. 1 or they may be other types or designs of short-path distillation evaporators. Raw citrus peel oil 80 (preferably degassed) is fed to the top of the first column 100 (i.e., the first stage) via line 82 and allowed to flow down the evaporator surface 102 as a film. A wiper system (not shown) can be used, as illustrated in FIG. 1, to more uniformly distribute the film on the evaporator surface 102. The first column 100 has a heat jacket 106 to transfer heat to the evaporator surface 102 using a heat transfer medium. The column also has an internal condenser 104 in close proximity to the evaporator surface. Vacuum pump 110 is used to apply a vacuum to space 108 between the evaporator surface 102 and the internal condenser 104. The first distillant stream 114 is collected from the internal condenser 104 and removed from column 100 via line 112. The first distillant stream 114, which is essentially pesticide-free citrus peel oil, is generally the 60 to 97 weight percent fraction. The unevaporated material or residue, which contains a significant volatile fraction as well as a pesticide-rich fraction, is removed from the bottom of evaporator surface 102 via line 116.

The unevaporated material from column 100 passes through line 116 into a siphon/pressure lock 118 and then through line 120 to the top of column 200 (i.e., the second stage). The siphon/pressure lock 118 allows columns 100 and 200 to be operated at different pressures if desired. The unevaporated material from column 100 is used as the feed material for column 200 and is allowed to flow down the evaporator surface 202 as a film. A wiper system (again not shown) can also be used, as illustrated in FIG. 1, to more uniformly distribute the film on the evaporator surface 202. The second column 200 has a heat jacket 206 to transfer heat to the evaporator surface 202 using a heat transfer medium. The column is also equipped with an internal condenser 204 in close proximity to the evaporator surface 202. Vacuum pump 210 is used to apply a vacuum to space 208 between the evaporator surface 202 and the internal condenser 204. The second distillant stream 214 is collected from the internal condenser 204 and removed from column 200 via line 212. The second distillant stream 214, which is essentially pesticide-free citrus peel oil, is generally the 20 to 40 weight percent fraction. The essentially pesticide-free distillants 114 and 214 from the two columns can be used separately or can be combined.

The residue from column 200, which contains essentially all the pesticides from the raw citrus peel oil 80 and only a relatively small amount (if any) of volatile material, is removed from the bottom of evaporator surface 202 via line 216. The lower portion of the evaporator surface 202 and a portion of line 216 may be heat jacketed. Passing a heat transfer fluid at an elevated temperature through heat jacket 222 can raise the temperature and decrease the viscosity of the residue to assist in its removal from column 200.

Figure 2:
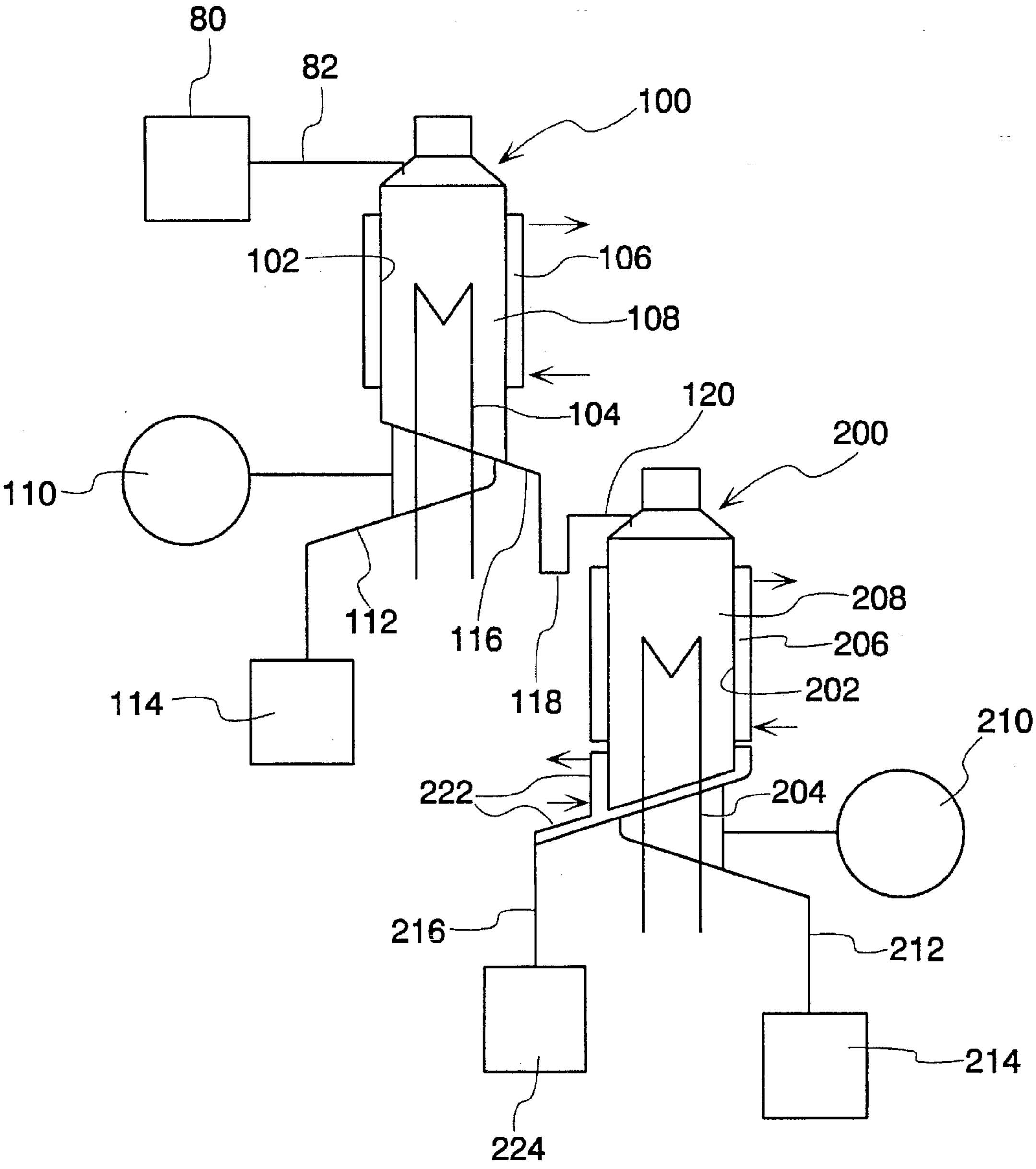
FIG. 2 is a schematic diagram illustrating a multiple short-path distillation column system for the preparation of the essentially pesticide-free citrus oil of the present invention.

FIG. 2 shows a two-stage distillation scheme using two short-path distillation columns arranged in series. This system could easily be modified to contain one or more additional short-path distillation columns if desired. In such a case, an additional short path distillation column could be added after column 200 whereby line 216 would be used to feed residue material onto the top of the evaporator surface of a third short-path distillation column. Preferably, line 216 would be modified to contain a siphon/pressure lock as between columns 100 and 200 in FIG. 2. Additional short-path distillation columns could be added in a similar manner. Where such multi-column systems are used, systems containing two to five short-oath distillation columns will generally be preferred. By varying the temperature, pressure, and dwell or residence times in each column, essentially pesticide-free citrus peel oils can be obtained with minimal decomposition or modification of the aroma and flavor components.

The system illustrated in FIG. 2, as well as distillation systems having three or more short-path distillation columns, are suited for continuous or semi-continuous operation. With the use of appropriate bypass lines (not shown in FIG. 2), operation could be continued while one (or even more) distillation columns are removed from service for maintenance, repair, or cleaning.

The essentially pesticide-free citrus oils of this invention generally have a total pesticide level of less than about 1.6 ppm, preferably less than about 0.5 ppm, more preferably less than about 0.1 ppm, and most preferably less than about 0.05 ppm. For purposes of this invention, "total pesticide level" is the sum of the organochlorine, organophosphorus, organonitrogen, and carbamate pesticides present In the peel oil. In determining the "total pesticide level," any pesticide which is not detected or is below the detection limit is considered to be present at a zero level. Preferably, the essentially pesticide-free citrus oils of this invention contain less than about 0.05 ppm total organochlorine pesticides, less than about 0.05 ppm total organophosphorus pesticides, less than about 0.05 ppm total organonitrogen pesticides, and less than about 0.05 ppm total carbamate pesticides. In the process of this invention, it is generally preferred that the total pesticide content of the essentially pesticide-free citrus oil is reduced by at least about 75 percent, more preferably by at least about 90 percent, and most preferably by at least about 99 percent when compared to the pesticide levels in the raw citrus oil.

This invention is especially suitable for treatment of raw citrus peel oils which are derived from citrus fruit peels contaminated with relatively high levels of pesticides. For purposes of this invention, "relatively high levels of pesticides" are levels above about 5 ppm for total pesticides or levels above about 2 ppm total organochlorine pesticides, about 2 ppm total organophosphorus pesticides, about 2 ppm total organonitrogen pesticides, and/or about 2 ppm total carbamate pesticides. The process of this invention can, however, be used to treat raw citrus oils which are relatively low in pesticides in order to even further reduce the pesticide levels therein.

It is a general objective of the present invention to reduce the level of any particular pesticide to below a tolerance limit (if any) set by the United States Environmental Protection Agency (EPA). Such tolerance limits are generally provided in 40 CFR Part 180 ("Tolerances and Exemptions From Tolerances for Pesticide Chemicals In or On Raw Agricultural Commodities") and in 40 CFR Part 185 ("Tolerances for Pesticides In Food"). Of course, it is preferred that the pesticide levels in citrus oil are reduced well below the current tolerance limits. Even if the level of a particular pesticide in the raw citrus oil is below its current tolerance limit, the use of the present invention has the potential to reduce the level of that pesticide even further.

Raw citrus oils can contain many different pesticides. The actual pesticides found in any particular sample will, of course, depend largely on the pesticides used to treat the fruit trees or soil and, perhaps, the pesticides used nearby which are carried into the orchard via wind and/or water. Thus, the pesticide content of the raw citrus oil can vary with differing growing regions (e.g., Florida, California, Brazil, etc.) as well as within a region depending of the particular pests involved and the pesticides used. The actual identity or level of the pesticides in the raw citrus oil is not critical to the practice of this invention so long as sufficient pesticides can be removed from the feed product to produce the essentially pesticide-free citrus oil of this invention.

Pesticides that may be found in raw citrus oil include, but are not limited to, organochlorine pesticides, organophosphorus pesticides, organonitrogen pesticides, carbamate pesticides, and metabolites thereof. Examples of organochlorine pesticides include lindane, chlorobenzilate, oxyfluorfen, BHC, HCB, DDT and metabolites, endfine, dieldrin, endosulfan, dicofol, tetradifon, toxaphene, and the like. Examples of organophosphorus pesticides include methidathion, ethion, methyl parathion, fenthion, and the like. Examples of organonitrogen pesticides include thiobendazole and the like. Example of carbamate pesticides include carbaryl, carbofuran, ferbam, zineb, ziram, and the like. Pesticides other than the ones specifically listed may also be present in the raw citrus oil; such pesticides can also be removed by the process of this invention. Many of the pesticides which can be removed or significantly reduced by the process of this invention include those listed in 40 CFR Part 180 ("Tolerances and Exemptions From Tolerances for Pesticide Chemicals In or On Raw Agricultural Commodities"), 40 CFR Part 185 ("Tolerances for Pesticides In Food"), and the "Pesticide Tolerance Chemical/Commodity Index" in 40 CFR Parts 150 to 189 at pp. 515–660 (7/1/91 edition), especially those pesticides used for treating citrus trees and fruits.

The following examples are intended to further illustrate the invention and not to limit it. The analytical protocol used for pesticides is based on *Pesticide Analytical Manual, vol.* 1, sec. 302, pp. 1–70 (3rd edition, 1994, U.S. FDA). Pesticide analysis of the peel oils and their fractions were performed at the National Food Processing Association Laboratory in Washington, D.C.

EXAMPLE 1

A sample of pesticide contaminated orange peel oil derived from Brazilian oranges was screened for pesticides. The analytical protocol used can detect 85 organochlorine pesticides, 60 organophosphorus pesticides, 15 organonitrogen pesticides, and 12 carbamate pesticides. The following analytical results were obtained:

| | |
|---|---|
| Organochlorine Pesticide Screen: | |
| Chlorobenzilate | 0.8 ppm |
| Dicofol | 23.7 ppm |
| Oxyfluorfen | 0.2 ppm |
| Tetradifon | 0.5 ppm |
| Organophosphate Pesticide Screen: | |
| Methidathion | 11.6 ppm |
| Ethion | 0.2 ppm |
| Organonitrogen Pesticide Screen: | |
| Thiobendazole | 17.1 ppm |
| Carbamate Pesticide Screen: | |
| none detected (i.e., <0.05 ppm). | |

The orange peel oil was gently distilled in a single wiped-film short-path distillation column (Model KD6 from UIC Inc. of Joliet, Ill.; generally as illustrated in FIG. 1) at a temperature of 90° C. and a pressure of 20 mm Hg. The slightly warm (about 29° C.) peel oil was fed to the top of the evaporator surface at a rate of about 737.3 g/hr. The temperature of the evaporator surface was maintained at 90° C.; the internal condenser was maintained at about 15° C.; and the wiper speed was adjusted to 350 rpm. The distillant was collected as the 93 weight percent fraction from the internal condenser. The residue (7 weight percent) was collected off the bottom of the evaporator wall.

The collected distillant was analyzed for pesticides using the same method as the raw orange peel oil. Total pesticides were less than 0.05 ppm. The distillant is an essentially pesticide-free orange peel oil.

EXAMPLE 2

A second sample of the raw orange peel oil of Example 1 was subjected to gentle distillation using the same distillation column and conditions (except as noted below) as described in Example 1. The feed rate was increased to 888 g/hr. The distillant was taken as the 92.4 weight percent fraction from the internal condenser. The residue (7.6 weight percent) was collected at the bottom of the evaporator wall. The collected distillant was analyzed in the same manner as in Example 1. Total pesticides were less than 0.05 ppm. This distillant is also an essentially pesticide-free orange peel oil.

EXAMPLE 3

A third sample of the raw orange peel oil of Example 1 was subjected to gentle distillation using a continuous pilot scale, wiped-film short-path distillation column (Model KD-10 from UIC of Joliet, Ill.) at a temperature of 137° C. and a pressure of 60 mm Hg. The peel oil (at about 2° C.) was fed to the top of the evaporator surface at a rate of about 19.0 kg/hr. The temperature of the evaporator surface was maintained at 137° C.; the internal condenser was maintained at about 25° C.; and the wiper speed was adjusted to 350 rpm. The distillant was collected as the 94.7 weight percent fraction from the internal condenser. The residue (5.3 weight percent) was collected off the bottom of the evaporator wall.

The collected distillant was analyzed for pesticides using the same method as in Example 1. The distillant contained less than about 0.1 ppm organochlorine pesticides, less than about 0.1 ppm organonitrogen, less than about 0.1 ppm carbamate pesticides, and about 1.18 ppm organophosphate pesticides (i.e., methidathion). The level of methidathion in the distillant is less than the maximum allowable level (i.e., 2 ppm). The distillant is an essentially pesticide-free orange peel oil.

That which is claimed is:

1. A method for producing an essentially pesticide-free citrus oil, said process comprising (1) gently distilling citrus oil feed material in a short-path distillation column at a temperature of about 80° to 135° C. and a pressure of about 2 to 80 mm Hg to form about 80 to 97 weight percent distillant and about 3 to 20 weight percent residue, wherein the distillant contains less than about 0.5 ppm total pesticides and the residue contains essentially all the pesticides from the citrus oil feed material and (2) collecting the distillant as the essentially pesticide-free citrus oil, wherein the short-path distillation column has an evaporator surface and an internal condenser less than about 50 cm apart, and the feed material has a residence time on the column of about 1 to about 5 minutes.

2. A method as defined in claim 1, wherein the citrus oil is citrus peel oil.

3. A method as defined in claim 2, wherein the short-path distillation column has a vertical heated wiped-film evaporator surface and an internal condenser less than about 50 cm apart, wherein the feed material is fed onto the evaporator surface and spread over the evaporator surface as a thin film as it is heated, whereby the distillant is collected from the internal condenser and the residue is collected from the bottom of the evaporator surface.

4. A method as defined in claim 3, wherein the feed material is degassed prior to the distillation step.

5. A method as defined in claim 4, wherein the feed material is distilled at a temperature of about 80° to 115° C. and a pressure of about 5 to 25 mm Hg to form about 90 to 97 weight percent distillant and about 3 to 10 weight percent residue.

6. A method as defined in claim 3, wherein the feed material is orange peel oil and the essentially pesticide-free citrus peel oil contains less than about 0.5 ppm total pesticides.

7. A method as defined in claim 6, wherein the essentially pesticide-free citrus peel oil contains less than about 0.1 ppm total pesticides.

8. A method as defined in claim 4, wherein the feed material is orange peel oil and the essentially pesticide-free citrus peel oil contains less than about 0.5 ppm total pesticides.

9. A method as defined in claim 8, wherein the essentially pesticide-free citrus peel oil contains less than about 0.1 ppm total pesticides.

10. A method for producing an essentially pesticide-free citrus oil, said process comprising (1) gently distilling citrus oil feed material in a first short-path distillation column at a temperature of about 80° to 115° C. and a pressure of about 5 to 80 mm Hg to form about 60 to 97 weight percent of a first distillant and about 3 to 40 weight percent of a first residue based on the weight of the feed material, (2) collecting the first distillant, (3) gently distilling the first residue in a second short-path distillation column at a temperature of about 115° to 135° C. and a pressure of about 2 to 20 mm Hg to form about 20 to 40 weight percent of a second distillant and about 60 to 80 weight percent of a second residue based on the weight of the first residue, and (4) collecting the second distillant, wherein the first and second distillants contain less than about 0.5 ppm total pesticides and the second residue contains essentially all the pesticides from the feed material, wherein the first and second short-path distillation columns have an evaporator surface and an internal condenser less than about 50 cm apart, and the feed material has a residence time on each column of about 1 to about 5 minutes.

11. A method as defined in claim 10, wherein the citrus oil is citrus peel oil.

12. A method as defined in claim 11, wherein the first short-path distillation column has a first vertical heated wiped-film evaporator surface and a first internal condenser less than about 50 cm apart from the first evaporator surface, wherein the feed material is fed onto the first evaporator surface and spread over the first evaporator surface as a first thin film as it is heated, whereby the first distillant is collected from the first internal condenser and the first residue is collected from the bottom of the first evaporator surface; and wherein the second short-path distillation column has a second vertical heated wiped-film evaporator surface and a second internal condenser less than about 50 cm apart from the second evaporator surface, wherein the first residue from the bottom of the first evaporator surface is fed onto the second evaporator surface and spread over the second evaporator surface as a second thin film as it is heated, whereby the second distillant is collected from the second internal condenser and the second residue is collected from the bottom of the second evaporator surface.

13. A method as defined in claim 11, wherein the feed material is degassed prior to distillation in the first short-path distillation column.

14. A method as defined in claim 13, wherein the first and second distillants are combined to form the essentially pesticide-free citrus peel oil.

15. A method as defined in claim 12, wherein the feed material is orange peel oil and the essentially pesticide-free citrus peel oil contains less than about 0.5 ppm total pesticides.

16. A method as defined in claim 12, wherein the feed material is degassed orange peel oil and the first and second distillants each contains less than about 0.5 ppm total pesticides.

17. A method as defined in claim 16, wherein the first and second distillants each contains less than about 0.1 ppm total pesticides.

18. A method for producing an essentially pesticide-free citrus oil in a distillation system containing at least three short-path distillation columns arranged in series, said method comprising (1) feeding and gently distilling citrus oil feed material in the first column in series at a temperature of about 80° to 115° C. and a pressure of about 5 to 80 mm Hg to form a distillant stream and a residue stream; (2) collecting the distillant stream from the first column; (3) feeding the residue stream from the preceding column into the next column in series and gently distilling the residue stream at a temperature of about 115° to 135° C. and a pressure of about 2 to 20 mm Hg to form a new distillant stream and a new residue stream associated with this column; (4) collecting the distillate stream from step (3); (5) repeating steps (3) and (4) for each additional column in series through the last column wherein the residue stream from the preceding column is the feed material for the next column and the distillate stream from each column is collected; and (6) combining the distillate streams from each column to form the essentially pesticide-free citrus oil containing less than about 0.5 pgm pesticide; wherein the residue stream from the last column in series contains essentially all the pesticides from the feed material, wherein each short-path distillation column has an evaporator surface and an internal condenser less than about 50 cm apart, and the feed material has a residence time on each column of about 1 to about 5 minutes.

19. A method as defined in claim 18, wherein the citrus oil is citrus peel oil.

20. A method as defined in claim 19, wherein each short-path distillation column has a vertical heated wiped-film evaporator surface and an internal condenser less than about 50 cm apart and wherein, for each column, its feed material is fed onto the evaporator surface and spread over the evaporator surface as a thin film as it is heated, whereby the distillant is collected from the internal condenser and the residue is collected from the bottom of the evaporator surface.

21. A method as defined in claim 20, wherein the citrus peel oil feed material is obtained from orange peels.

22. A method as defined in claim 21, wherein the feed material is degassed prior to distillation in the first column.

* * * * *

UNITED STATES PATENT AND TRADEMARK OFFICE

CERTIFICATE OF CORRECTION

PATENT NO. : 5,558,893

DATED : September 24, 1996

INVENTOR(S) : Muraldihara

It is certified that error appears in the above-indentified patent and that said Letters Patent is hereby corrected as shown below:

IN THE CLAIMS:

Column 13, line 6, change "pgm" to --ppm--.

Signed and Sealed this

Twenty-fifth Day of February, 1997

*Attest:*

BRUCE LEHMAN

*Attesting Officer*

*Commissioner of Patents and Trademarks*